United States Patent
Citron et al.

(10) Patent No.: US 9,603,115 B2
(45) Date of Patent: Mar. 21, 2017

(54) METHOD AND APPARATUS FOR CELLULAR ROAMING CHARGE BYPASS CALL COMPLETION

(75) Inventors: Jeffrey Citron, Brielle, NJ (US); Nicholas P. Lazzaro, Atlanta, GA (US); Daniel Grisinger, Freehold, NJ (US); Joseph Pagnotta, Red Bank, NJ (US)

(73) Assignee: VONAGE AMERICA INC., Holmdel, NJ (US)

( * ) Notice: Subject to any disclaimer, the term of this patent is extended or adjusted under 35 U.S.C. 154(b) by 1270 days.

(21) Appl. No.: 12/987,559

(22) Filed: Jan. 10, 2011

(65) Prior Publication Data
US 2011/0275367 A1 Nov. 10, 2011

Related U.S. Application Data

(60) Provisional application No. 61/335,606, filed on Jan. 8, 2010.

(51) Int. Cl.
*H04W 4/00* (2009.01)
*H04W 60/00* (2009.01)
(Continued)

(52) U.S. Cl.
CPC ....... *H04W 60/005* (2013.01); *H04M 7/0057* (2013.01); *H04M 7/123* (2013.01);
(Continued)

(58) Field of Classification Search
CPC ....... H04M 2203/1091; H04M 3/4234; H04M 7/006; H04W 36/0011; H04W 36/14;
(Continued)

(56) References Cited

U.S. PATENT DOCUMENTS 7,990,912 B2 * 8/2011 Nix et al. ............... 370/328
2006/0264213 A1 * 11/2006 Thompson ............... 455/433
(Continued)

OTHER PUBLICATIONS

International Search Report in PCT/US2011/00033 mailed Mar. 15, 2011.
(Continued)

*Primary Examiner* — Joseph Arevalo
(74) *Attorney, Agent, or Firm* — Nixon & Vanderhye P.C.; Joseph Pagnotta

(57) ABSTRACT

Systems and methods for avoiding roaming or communications charges when a mobile communications device such as a cellular telephone receives an incoming telephone call use a non-native communications provider, such as a VOIP service provider to redirect the call. A subscriber's mobile communications device establishes a data connection to the VOIP service provider through a data network, and call forwarding instructions are issued to the subscriber's telephony service provider to cause calls directed to the subscriber's mobile communications device to be redirected to a forwarding telephone number associated with the VOIP service provider. When a call is placed to the subscriber's normal telephone number, the call is forwarded to the VOIP service provider. The VOIP service provider establishes a VOIP communications channel with the subscriber's mobile communications device via a data network, and the incoming call is connected to the subscriber's mobile communications device via the VOIP communications channel.

16 Claims, 3 Drawing Sheets

(51) Int. Cl.
*H04M 7/12* (2006.01)
*H04M 7/00* (2006.01)
*H04L 12/707* (2013.01)
*H04W 8/08* (2009.01)
*H04W 76/02* (2009.01)
*H04M 3/42* (2006.01)
*H04M 3/54* (2006.01)

(52) U.S. Cl.
CPC .......... *H04L 45/22* (2013.01); *H04M 3/4228* (2013.01); *H04M 3/54* (2013.01); *H04M 7/1285* (2013.01); *H04M 2207/185* (2013.01); *H04W 8/08* (2013.01); *H04W 76/02* (2013.01)

(58) Field of Classification Search
CPC ....... H04W 36/30; H04W 4/16; H04W 76/02; H04W 80/10; H04W 84/04; H04W 84/105
USPC ......... 455/418, 552.1, 41.2, 426.1, 411, 416, 455/436, 433, 566, 419, 432.1, 417; 370/352, 328, 310, 259, 389, 351, 356
See application file for complete search history.

(56) References Cited

U.S. PATENT DOCUMENTS

| | | |
|---|---|---|
| 2006/0286984 A1 | 12/2006 | Bonner |
| 2007/0015536 A1* | 1/2007 | LaBauve et al. .......... 455/552.1 |
| 2007/0064682 A1* | 3/2007 | Adams et al. ................ 370/352 |
| 2007/0070976 A1 | 3/2007 | Mussman et al. |
| 2007/0121580 A1* | 5/2007 | Forte et al. .................... 370/351 |
| 2007/0167167 A1 | 7/2007 | Jiang |
| 2007/0274485 A1* | 11/2007 | Garrison .................. 379/142.01 |
| 2008/0153480 A1* | 6/2008 | Jiang ......................... 455/426.1 |
| 2008/0220756 A1* | 9/2008 | Liu ............................... 455/417 |
| 2008/0244148 A1* | 10/2008 | Nix et al. ...................... 710/313 |
| 2011/0069826 A1* | 3/2011 | Adams et al. ............ 379/211.02 |
| 2011/0096771 A1* | 4/2011 | Saru et al. .................... 370/352 |

OTHER PUBLICATIONS

Partial Search Report issued PCT/US2012/071248 issued Jun. 24, 2013.

"3rd Generation Partnership Project; Technical Specification Group Core Network and Terminals; Call Forwarding (CF) supplementary services; Stage 2 (Release 11)", 3GPP Standard; 3GPP TS 23.082, 3rd Generation Partnership Project (3GPP), Mobile Competence Centre; 650, Route Des Lucioles, F-06921 Sophia-Antipolis Cedex; France, vol. CT WG4, No. V11.0.0, Dec. 17, 2011 (Dec. 17, 2011), pp. 1-86, XP050554577, [retrieved on Dec. 17, 2011] paragraphs [0001]- [01.2]; figures 1.1, 1.11.

Anonymous: "Easy Call Forwarding App" Android Forums, Dec. 2, 2010 (Dec. 2, 2010) pp. 1-4, XP055066320, Retrieved from the Internet: URL:http://androidforums.com/android-applications/7380-easy-call-forwarding-app.html [retrieved on Jun. 12, 2013] the whole document.

* cited by examiner

METHOD AND APPARATUS FOR CELLULAR ROAMING CHARGE BYPASS CALL COMPLETION

FIELD OF THE INVENTION

The invention is related to the field of telecommunication devices and services. More specifically, the invention is directed to methods and apparatus for completing telecommunication session requests initiated over a PSTN/cellular network via a VoIP network.

BACKGROUND OF THE INVENTION

Voice over IP (VOIP) is a technological development in the field of telecommunications that is utilized to establish and provide voice communications over a data network using the Internet Protocol (IP). Entities (e.g., businesses or individuals) implement VOIP by purchasing and installing the necessary equipment (e.g., one or more Customer Premise Equipment (CPE) devices) and obtaining access to a data service (i.e., a "high speed" data network or a broadband connection) to access a VoIP service provider. The entities then establishing an account with a VOIP service provider.

Because VoIP is a relatively new technology in terms of its commercial penetration, it has not completely supplanted the existing and traditional telecommunications systems commonly referred to as the Public Switched Telephone Network (PSTN) or Plain Old Telephone Service (POTS). This aspect extends into the wireless telecommunications space where cellular telephones, towers and satellites have augmented the "reach" of the PSTN beyond traditional land lines by operating according to wireless communications protocols such as Global System for Mobile communications (GSM) and the like. To further complicate matters, VoIP-based devices and existing PSTN-based devices are currently not compatible without the presence of additional equipment. Consequently, entities are reluctant to completely abandon existing PSTN equipment.

Cellular communication networks have substantial drawbacks for subscribers depending upon the location in which the subscriber is attempting to make a communication request. For example, cellular subscribers often are provided with a "calling area" in which they are able to operate their devices as part of a flat rate calling plan. If the subscriber moves outside of this area, the subscriber's device will begin polling for cellular network access in the area where it is currently located (also known as "roaming"). If the subscriber's cellular device detects cellular network access from a cellular service provider that is not the subscriber's provider for the region in which it is roaming, additional costs are incurred by the subscriber. These charges are typically in the form of per minute charges for time that the device is in an "off-hook" status or otherwise performing communication tasks. Roaming charges can be exorbitant compared to fees charged for communications within the subscriber's calling area. International roaming charges are particularly expensive, as the rates negotiated between carriers for overseas call termination has been at a premium. Therefore, there is a need in the art for a method, system and apparatus to use VOIP technology in a wireless/cellular environment so as to exploit the low cost associated with VOIP communication sessions.

BRIEF DESCRIPTION OF THE FIGURES

To assist in the disclosure of the present invention, reference to the following appended drawings is made. It should be noted that the appended drawings illustrate only exemplary embodiments of this invention and are therefore not to be considered limiting of its scope, for the invention may admit to additional embodiments.

DETAILED DESCRIPTION OF PREFERRED EMBODIMENTS

During a typical cellular telephone communication session (e.g., telephone call) a cellular telephony device communicates with elements of a cellular network. If that cellular network is not part of the party's preferred calling area, roaming charges are incurred. To avoid roaming charges, the invention provides a method, system and apparatus to redirect communications to and from the cellular telephony device off of a cellular network's voice channel, and onto a path where such roaming charges are not incurred. Such a path is provided by a non-native communications provider, for example, a data packet network (e.g., VOIP provider network) or a cellular data channel where voice communications can be implemented via Internet Protocol means.

In systems and methods embodying the invention, signaling and call set up for a communications session is not performed exclusively by the traditional means governed by ISDN and POTS. Part of the call processing may be conducted by non-traditional means, such as over a packet-based or VOIP network. Signaling that is conducted in the packet-based network(s) is preferably executed using Session Initiation Protocol (SIP). SIP is a popular communication protocol for initiating, managing and terminating media (e.g., voice, data and video) sessions across packet-based networks that typically use the Internet Protocol (IP), of which VOIP is an example. The details and functionality of SIP can be found in the Internet Engineering Task Force (IETF) Request for Comments (RFC) Paper No. 3261 entitled, "SIP: Session Initiation Protocol" herein incorporated in its entirety by reference.

SIP establishes and negotiates a session, including the modification or termination of a session. It uses a location-independent address system feature in which called parties can be reached based on a party's name. SIP supports name mapping and redirection allowing users to initiate and receive communications from any location. Of course, while SIP is a preferred protocol for establishing communications over a data network, other signaling protocols could also be used to perform the invention.

Figure 1:
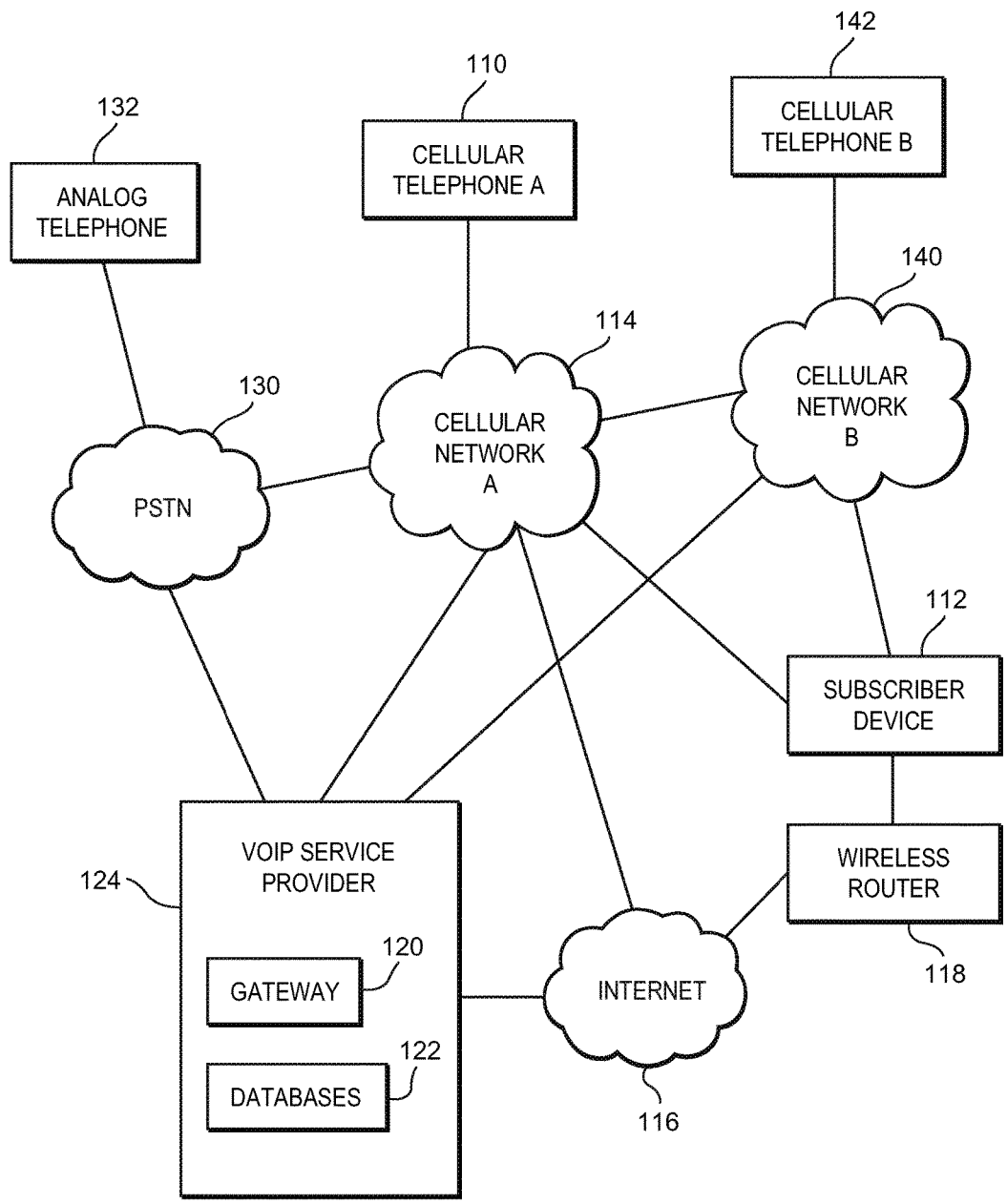
FIG. 1 depicts a system level representation of a network or networks that interact with each other to perform communication request fulfillment in accordance with one embodiment of the subject invention.

FIG. 1 depicts a system for performing call termination to a subscriber's cellular telephony device 112 while bypassing the native cellular network voice channel in accordance with one embodiment of the invention. The system comprises one or more networks that include, but are not limited to, a first cellular telephony network "A" 114 from which an originating call request is made. Cellular telephony network "A" 114 may be, for example, a mobile telephone network accessed by a calling party's cellular telephone A 110. A calling party might also place a telephone call using cellular telephone "B" 142 by accessing a second cellular network "B" 140. Further, a calling party might initiate a call to the subscriber's cellular telephony device 112 from an analog telephone 132 that is coupled to a traditional PSTN 130.

Through the use of call forwarding techniques, which are explained in greater detail below, when cellular telephone A 110 requests that a communications session be established with the subscriber's device 112, the request is passed from cellular network A 114 to a VOIP service provider 124. When the VOIP service provider 124 receives the request, the VOIP service provider 124 establishes a VOIP communications session with the subscriber's device 112, and the call from cellular telephone A 110 is coupled to the subscriber's device 112 through that VOIP communications session. Because the call is connected to the subscriber's cellular telephony device 112 through a VOIP data network connection, and not a cellular network, the subscriber can avoid any roaming costs for the inbound communication that otherwise would have been charged.

In some embodiments of the invention, the VOIP service provider 124 may include one or more gateways or servers 120 that are used to communicate with originating telephony networks such as the PSTN, cellular network A 114 and/or cellular network B 140. The VOIP service provider 124 may also include one or more databases 122 for the storage and retrieval of registration information regarding the subscriber cellular telephony devices.

As also depicted in FIG. 1, the subscriber's cellular device 112 is capable of establishing a connection with a data network 116, such as the Internet, via a wireless access point 118. Thus, the VOIP service provider is able to communicate with the subscriber's cellular telephony device 112 over the data network 116. In some embodiments, the link between the subscriber's device 112 and the data network 116 may be via a WiFi connection. In other instances, the subscriber device 112 could establish a data link in other ways, such as through a wireless Local Area Network (LAN), a Wide Area Network (WAN) gateway, a hardwired Internet connection and the like.

When the subscriber's cellular telephony device 112 detects the availability of a data network connection, such as the wireless access point 118 shown in FIG. 1, the subscriber's cellular telephony device 112 contacts the VOIP service provider 124 to register with same. In some embodiments, at this point in time, a call forwarding operation is also performed to instruct the subscriber's home cellular network provider to forward all calls directed to the subscriber's cellular service telephone number to an alternate forwarding telephone number. In other embodiments, the call forwarding instructions may have already been issued. Calls to the forwarding telephone number are directed to the VOIP service provider 124. As a result, whenever a calling party dials the subscriber's normal telephone number, the call will be sent to the VOIP service provider 124.

The call forwarding operation can be performed in a variety of different ways, and in response to variety of different triggering events. For instance, the call forwarding operation could be performed automatically whenever the subscriber's cellular telephony device 112 contacts the VOIP service provider 124 through the data network 116. Alternatively, or in addition, the call forwarding operation could be automatically performed whenever the subscriber's cellular telephony device detects that it has left its home cellular network calling area. In other instances, the call forwarding operation could be performed at the explicit request of the subscriber.

The call forwarding operation could be accomplished via signals transmitted from the subscriber's cellular telephony device 112. Assuming that cellular network A 114 is the subscriber's cellular service provider, the subscriber's device 112 might communicate call forwarding instructions directly to cellular network A 114. Alternatively, if the subscriber's device 112 is in a physical location where the subscriber's device 112 cannot reach cellular network A 114, but it can reach cellular network B 140, the subscriber's device 112 might communicate call forwarding instructions to cellular network B 140, and cellular network B 140 would pass those call forwarding instructions along to cellular network A 114. In still other instances, if the subscriber's device 112 can link to the data network 116, the call forwarding instructions could be sent to cellular network A 114 through the data network 116.

The call forwarding operation might also be performed by the VOIP service provider 124. For instance, when the subscriber's device 112 contacts the VOIP service provider 124 over the data network 116 to register itself, the VOIP service provider 124 would then send call forwarding instructions to cellular network A 114. The call forwarding instructions could be in the form of cellular telephone signaling carried over a cellular telephone link to cellular network A 114, or in the form of data communications carried over a data link to cellular network A 114.

Call forwarding instructions can often be sent to a cellular service provider directly from a cellular telephony device. When a subscriber device 112 is in a physical location where it cannot directly reach the subscriber's cellular service provider, the subscriber device may attempt to relay call forwarding instructions through a different cellular service provider. Unfortunately, such call forwarding instructions are not always passed along from one cellular service provider to the next. Thus, in some instances, it may be impossible for a subscriber device to communicate call forwarding instructions to the subscriber's cellular service provider through a third party cellular service provider. For this reason, when a subscriber's cellular telephony device is located outside its normal calling area (roaming), it may be advantageous for the VOIP service provider 124 to send the call forwarding instructions to the subscriber's cellular service provider. Having the VOIP service provider send the call forwarding instructions may be a more certain way of ensuring that the call forwarding will occur.

The telephone number to which calls are redirected could be a dedicated forwarding telephone number that has been established for the subscriber device 112. In other embodiments, the forwarding telephone number could be assigned by the VOIP service provider 124 each time that the subscriber device 112 contacts the VOIP service provider 124 and registers itself. In this instance, and if the subscriber device issues the call forwarding instructions to cellular network A, the forwarding telephone number assigned by the VOIP service provider 124 would be communicated to the subscriber device 112 as part of the registration process. The subscriber device 112 would then use this information to issue the call forwarding instructions.

A typical sequence for establishing a call to the subscriber device 112 via a VOIP link through the data network 116 will now be provided with reference to FIG. 1.

First, the subscriber device 112 would determine that it can communicate over the data network 116, either through a wireless access point 118, or by other means. The subscriber device 112 would then contact the VOIP service provider to register itself with same. As part of the registration process, call forwarding instructions will be sent to the subscriber's cellular service provider, in this case to cellular network A 114. As noted above, those call forwarding instructions could be sent from the subscriber device 112 or from the VOIP service provider 124.

Next, a caller places a call to the subscriber's normal telephone number. For instance, the caller uses cellular telephone A 110 to place a call to the subscriber's normal telephone number. This call request will be received by cellular network A, which is the subscriber's cellular service provider. By virtue of the call forwarding instructions it has received, cellular network A will know that the call should be sent to the call forwarding telephone number. And because the call forwarding number is associated with the VOIP service provider 124, the call will be routed to the VOIP service provider 124, such as through a gateway or server 120 maintained by the VOIP service provider 124.

The VOIP service provider 124 will resolve the forwarding telephone number to the subscriber device 112 via information stored in a database 122. In some embodiments, the server 120 that receives the inbound call will use the inbound number to perform a database lookup to determine the specific device for which this call is intended. The server 120 looks up the registration information for the subscriber device 112 that is now reachable via the data network 116 based on the registration step described above.

The VOIP service provider 124 will then establish a VOIP call with the subscriber device 112 via the data network 116 and the wireless access point 118. In some embodiments of the invention, a server 120 initiates a VOIP call via the Internet 116 to the subscriber device 112. The VOIP call to the subscriber device 112 is then connected to the inbound call from cellular telephone A 110. The signaling and media proceed as is standard in a VOIP call. One service and network capable of providing the Internet telephony path in the manner describe is VOIP service provider Vonage Holdings Corp. of Holmdel, N.J.

If the caller attempting to reach the subscriber device 112 is using analog telephone 132, the call would first be sent from the analog telephone 132 to the PSTN 130. Because the caller will have dialed the subscriber's normal telephone number, that call will be forwarded to cellular service provider A 114. From this point on, the call processing would proceed as described above.

As described above, a relationship exists between the cellular network 114 and the subscriber device 112 such that roaming charges are incurred whenever the subscriber device 112 utilizes some other cellular network to complete a call. An example of such a situation is where the subscriber device 112 is registered to operate on a domestic cellular service provider network, and the subscriber device 112 is temporarily located internationally. In such circumstances, the subscriber could utilize the systems and methods described above to avoid incurring roaming charges associated with the use of an international carrier.

In other instances, although the subscriber device 112 is still located within his home calling area, the subscriber might still want to utilize the systems and methods described above to minimize or avoid the consumption of minutes allocated to the subscriber in accordance with an agreement for telecommunication services. In this instance, the subscriber might configure his subscriber device 112 such that whenever the subscriber device 112 detects the availability of a data network connection, such as a wireless router 118 connected to the Internet 116, use of the system and methods described above are automatically initiated.

Other scenarios in which cellular roaming charges are bypassed via call forwarding to a VOIP service provider 124 are also within the scope of the invention. In one alternate embodiment of the invention, registration of the subscriber device 112 with the VOIP service provider 124 occurs if there is no connection between the subscriber device 112 and a cellular network access point (i.e., cell tower, antenna or the like). In this embodiment, there is no distinction as to where the subscriber device 112 is located (i.e., within its domestic cellular provider service area, in an international cellular provider service area or elsewhere). In this embodiment, calls to the subscriber device 112 are forwarded via the VOIP service provider 124 without having to detect the availability of a data network as described earlier.

In another embodiment of the invention, initial detection of a wireless access point 118 and subsequent registration of the subscriber device 112 with the VOIP service provider 124 is not a requirement to forward a communication request. In such an embodiment, all communication requests directed to the subscriber device 112 are always forwarded to the VOIP service provider 124. The VOIP service provider 124 then performs a subscriber device registration status operation to determine what type of access (i.e., what network) the subscriber device 112 has. That is, testing is performed by the VOIP service provider 124 for the different types of connections that the subscriber device 112 can make. Based on the results of the test and connection type, the call is the terminated in a specific manner.

The testing for a subscriber device's availability may be performed on a per communication request basis, on a periodic basis, or on some other basis known to those skilled in the art. Test parameters may be selected from the group consisting of device registration as described above, Global Positioning System techniques, other locational means known to those skilled in the art and quality of service of the available network connections. For example, if the subscriber device 112 has access to the VOIP service provider 124 through a data link having sufficient voice call quality, a communication request will be processed via the data network connection. If there is no such access, the communication request may be terminated by means selected from the group consisting of a voicemail server, other forwarding operations to another subscriber device or telephone number, and a recording indicating that the call could not be completed or other "no answer" type of signal. If so desired by the subscriber (via customized communication request handling prioritization), and if the subscriber device 112 is connected to a cellular provider, the means may also include termination via a cellular network.

Figure 2:
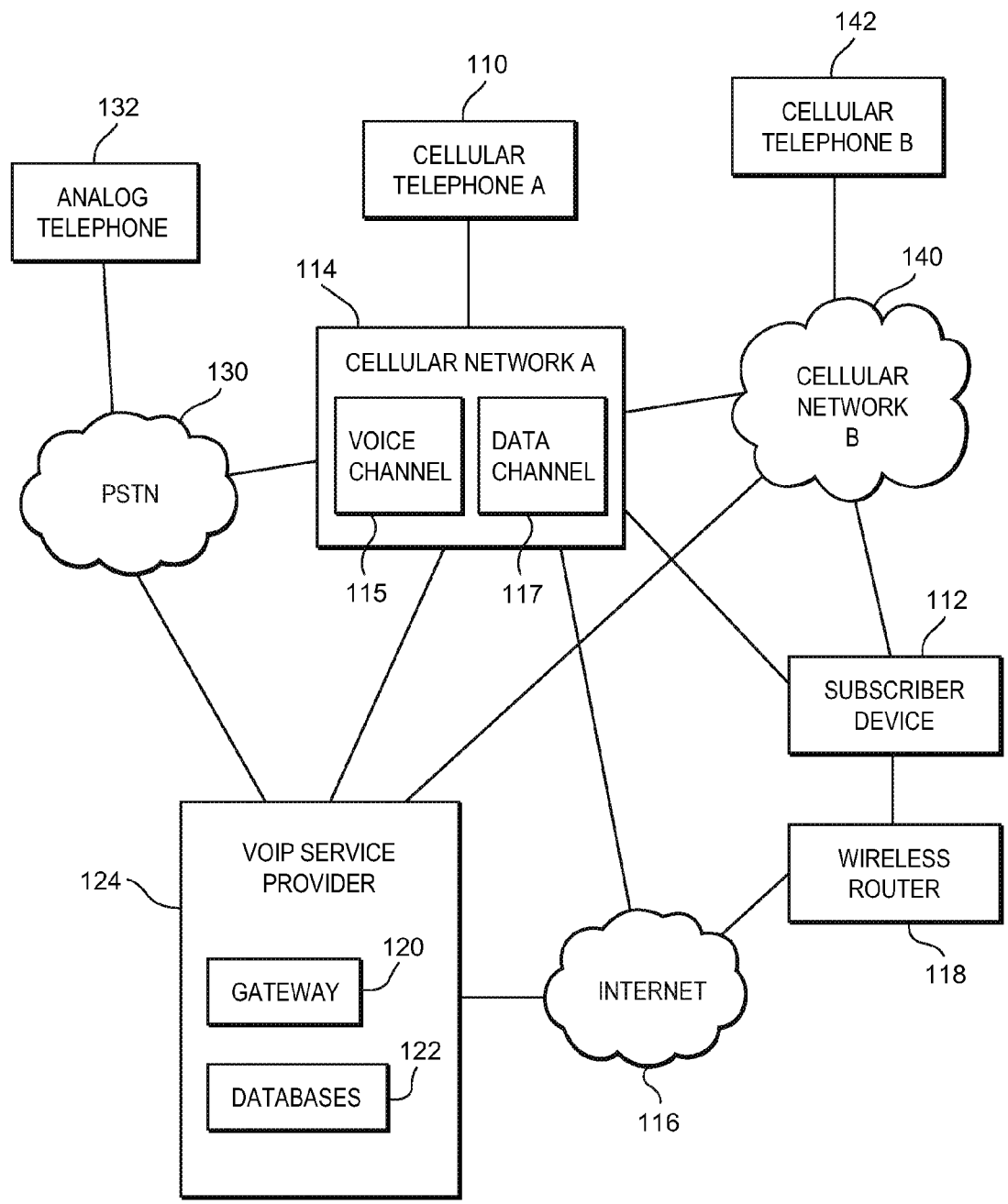
FIG. 2 depicts another system level representation of a network or networks that interact with each other to perform communication request fulfillment in accordance with one embodiment of the subject invention.

FIG. 2 depicts a system for performing call termination via bypassing of the cellular voice channel in accordance with another embodiment of the invention. In this embodiment, the call resolution process establishes the communication session via the VOIP service provider 124 and a reduced-cost channel that is part of the originating cellular network A 114. That is, the scenario described is for avoiding roaming charges for inbound communication requests to a wireless subscriber's device 112 by exploiting a data channel 117 associated with or otherwise provided by the originating cellular network 114, instead of through use of a separate voice channel 115.

In this embodiment, the subscriber device 112 detects availability of a data network which is provided as part of the originating cellular network A infrastructure (e.g., a cellular data channel Internet connection). The subscriber device then registers with the VOIP service provider 124 and causes call forwarding instructions to be issued to cellular network A 114 so that calls to the subscriber's normal telephone number are instead forwarded to a forwarding telephone number. As explained above, for the embodiment of the invention disclosed in FIG. 1, the call forwarding operation can happen either automatically or in response to an explicit action taken by the subscriber using his subscriber device 112.

Once the subscriber device 112 has registered with the VOIP service provider and once the call forwarding instructions have been issued to the cellular service provider 114, the call processing proceeds as described above. Except that in this embodiment, the data communications between the subscriber device 112 and the VOIP service provider 124 all pass through the data channel 117 provided by cellular network A 114. The subscriber device 112 does not independently communicate over a wireless router 118 or other path onto the data network 116, but rather relays such data communications through the cellular network's data channel.

As an additional feature of the call termination processes presented above, an enhanced security option is made available. That is, once a communication request is passed to the VoIP service provider 124, call signaling and media connections between the VOIP service provider 124 and the subscriber device 112 may be encrypted to provide a secure communication session. The encryption techniques that are used could the RSA encryption, as described in *PKCS#1 v2.1: RSA Cryptography Standard*, RSA Laboratories, dated Jun. 14, 2002, or AES encryption as described in *Advanced Encryption Standard (AES)*, Federal Information Processing Standards Publication 197, dated Nov. 26, 2001, or the techniques described in *Secure Socket Layer (now Transport Layer Security) Protocol, Version* 1.2 as described in IETF RFC 5246, dated August 2008, all of which are incorporated herein by reference.

Figure 3:
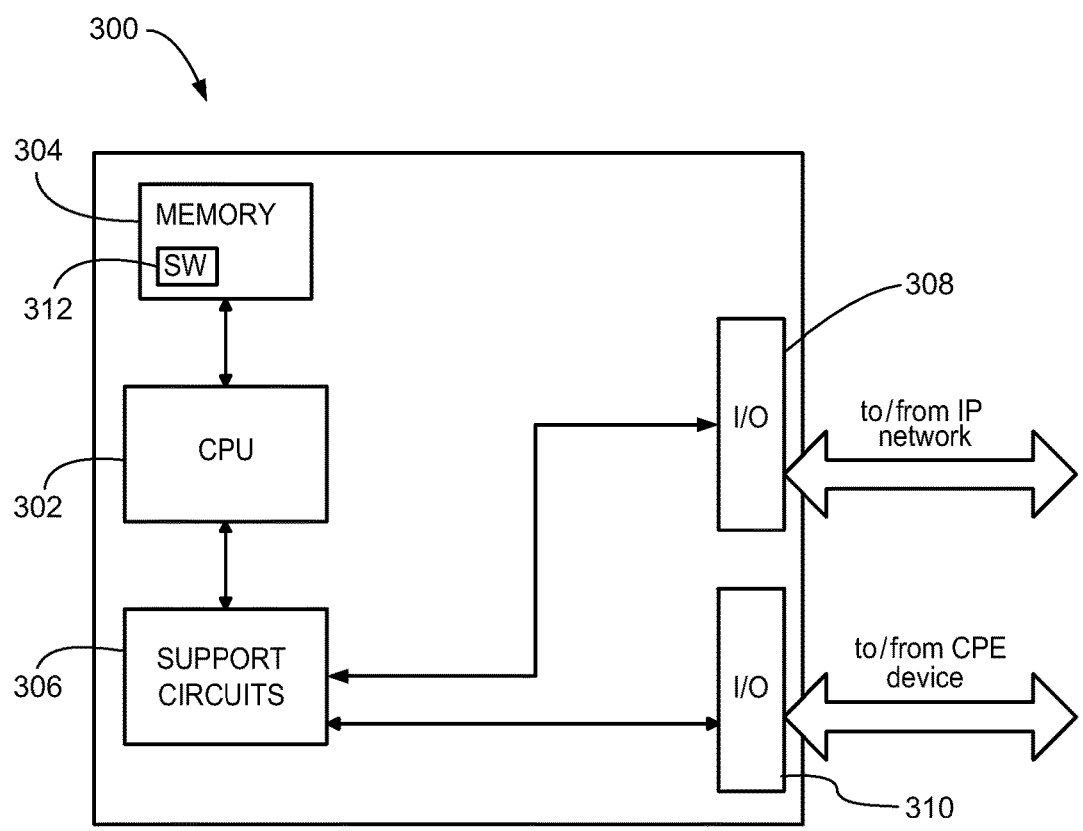
FIG. 3 depicts a schematic diagram of a controller that may be used to practice one or more embodiments of the present invention; and To facilitate understanding, identical reference numerals have been used, where possible, to designate identical elements that are common to the figures.

FIG. 3 depicts a schematic diagram of a controller that may be used to practice one or more embodiments of the present invention. In some embodiments of the invention, the subscriber device 112 as discussed herein can function as a controller for processing phone calls in the manner described. The subscriber device 112 acts in the manner described after receiving programming instructions that are stored in memory as described below.

The controller 300 may be one of any form of a general purpose computer processor used in accessing an IP-based network such as the LAN/WAN presented above, a corporate intranet, the Internet or the like. The controller 300 comprises a central processing unit (CPU) 302, a memory 304, and support circuits 306 for the CPU 302. The controller 300 also includes provisions 308/310 for connecting the controller 300 to databases, customer equipment and/or service provider agent equipment and the one or more input/output devices (not shown) for accessing the controller 300 and/or performing ancillary or administrative functions related thereto. Note that the provisions 308/310 are shown as separate bus structures in FIG. 3; however, they may alternately be a single bus structure without degrading or otherwise changing the intended operability of the controller 300 or invention in general. Additionally, the controller 300 and its operating components and programming as described in detail below are shown as a single entity; however, the controller may also be one or more controllers and programming modules interspersed around a system each carrying out a specific or dedicated portion of the name translation process. By way of non-limiting example, a portion of the controller 300 or software operations may occur at the subscriber device 312 of FIG. 1 and another a portion of the controller 300 or software operations may occur at the VOIP service provider 124 of FIG. 1. Other configurations of the controller and controller programming are known and understood by those skilled in the art.

The memory 304 is coupled to the CPU 302. The memory 302, or computer-readable medium, may be one or more of readily available memory such as random access memory (RAM), read only memory (ROM), floppy disk, hard disk, flash memory or any other form of digital storage, local or remote. The support circuits 306 are coupled to the CPU 302 for supporting the processor in a conventional manner. These circuits include cache, power supplies, clock circuits, input/output circuitry and subsystems, and the like. A software routine 312, when executed by the CPU 302, causes the controller 300 to perform processes of the present invention and is generally stored in the memory 304. The software routine 312 may also be stored and/or executed by a second CPU (not shown) that is remotely located from the hardware being controlled by the CPU 302.

The software routine 312, when executed by the CPU 302, transforms the general purpose computer into a specific purpose computer (controller) 300 that controls call completion so as to avoid cellular roaming charges in the manner described. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware. The software routine 312 of the present invention is capable of being executed on computer operating systems including but not limited to Microsoft Windows 98, Microsoft Windows XP, Apple OS X and Linux, as well as various operating systems which have been developed for mobile computing devices, such as the Android operating system. Similarly, the software routine 312 of the present invention is capable of being performed using CPU architectures including but not limited to Apple Power PC, Intel x82, Sun service provider agentRC and Intel ARM.

While foregoing is directed to embodiments of the present invention, other and further embodiments of the invention may be devised without departing from the basic scope thereof, and the scope thereof.

The invention claimed is:

1. A method of connecting a communication request to a mobile communications device associated with a first telephony service provider, wherein a first telephone number associated with the first telephony service provider is assigned to the mobile communications device, comprising:
registering the mobile communications device with a second telephony service provider;
causing the mobile communications device to send call forwarding instructions to the first telephony service provider, the call forwarding instructions instructing the first telephony service provider to forward all incoming telephony communications that are directed to the first telephone number to a forwarding telephone number;
receiving a communication request directed to the forwarding telephone number; and
redirecting the received communication request to the mobile communications device via a data network.

2. The method of claim 1, wherein the redirecting step comprises connecting the communication request to the mobile communications device via a wireless access point and a data connection.

3. The method of claim 2, wherein the wireless access point is selected from the group consisting of a WiFi protocol access point and a cellular network protocol access point.

4. The method of claim 2, wherein the data connection is selected from the group consisting of the data channel of a cellular telephone network and the Internet.

5. The method of claim 1, wherein the registering step comprises:
receiving a device identification number of the mobile communications device; and
associating the device identification number with a forwarding telephone number associated with the mobile communications device in a database.

6. The method of claim 5, wherein the redirecting step comprises:
determining the device identification number of the mobile communications device, using the forwarding telephone number, by consulting the database; and
using the determined device identification number to establish a VOIP communications link with the mobile communications device via the data network.

7. The method of claim 5, wherein the registering step comprises assigning the forwarding telephone number.

8. The method of claim 7, wherein the forwarding telephone number that has been assigned is selected from the group consisting of a dedicated number established for the mobile communications device and a newly assigned number each time the registration step is performed.

9. The method of claim 1, wherein the registering step comprises:
receiving a device identification number of the mobile communications device from the mobile communications device;
receiving a forwarding telephone number from the mobile communications device; and
associating the device identification number with the forwarding telephone number in a database.

10. A system for connecting a communication request to a mobile communications device that is associated with a first telephony service provider, wherein a first telephone number associated with the first telephony service provider is assigned to the mobile communications device, comprising:
means for registering the mobile communications device with a second telephony service provider;
means for causing the mobile communications device to send call forwarding instructions to the first telephony service provider, the call forwarding instructions instructing the first telephony service provider to forward all incoming telephony communications that are directed to the first telephone number to a forwarding telephone number;
means for receiving a communication request directed to the forwarding telephone number; and
means for redirecting the received communication request to the mobile communications device via a data network.

11. A system for connecting a communication request to a mobile communications device associated with a first telephony service provider, wherein a first telephone number associated with the first telephony service provider is assigned to the mobile communications device, comprising:
a registration unit that registers the mobile communications device with a second telephony service provider;
a redirection unit that:
causes the mobile communications device to send call forwarding instructions to the first telephony service provider, the call forwarding instructions instructing the first telephony service provider to forward all incoming telephony communications that are directed to the first telephone number to a forwarding telephone number,
receives a communication request directed to the forwarding telephone number, and
redirects the received communication request to the mobile communications device via a data network.

12. The system of claim 11, wherein the registration unit receives a device identification number of the mobile communications device and associates the device identification number with a forwarding telephone number associated with the mobile communications device in a database.

13. The system of claim 12, wherein the redirection unit determines the device identification number of the mobile communications device, using the forwarding telephone number, by consulting the database, and uses the determined device identification number to establish a VOIP communications link with the mobile communications device via the data network.

14. The system of claim 12, wherein the registration unit assigns the forwarding telephone number.

15. The system of claim 14, wherein the forwarding telephone number that has been assigned is selected from the group consisting of a dedicated number established for the mobile communications device and a newly assigned number each time the mobile communications device registers with the non-native communications provider.

16. The system of claim 11, wherein the registration unit receives a device identification number of the mobile communications device and a call forwarding number from the mobile communications device, and wherein the registration unit associates the device identification number with the forwarding telephone number in a database.

* * * * *